(12) United States Patent
Kwon et al.

(10) Patent No.: US 7,462,961 B2
(45) Date of Patent: Dec. 9, 2008

(54) SUPERCONDUCTIVITY ROTOR HAVING TORQUE TUBE

(75) Inventors: Woon-Sik Kwon, Gyeongsangnam-do (KR); Tae-Sun Moon, Busan (KR); Heui-Joo Park, Gyeongsangnam-do (KR); Yeong-Chun Kim, Gyeongsangnam-do (KR)

(73) Assignee: Doosan Heavy Industries & Construction Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 11/654,575

(22) Filed: Jan. 18, 2007

(65) Prior Publication Data

US 2008/0100158 A1 May 1, 2008

(30) Foreign Application Priority Data

Oct. 27, 2006 (KR) ...................... 10-2006-0105032

(51) Int. Cl.
*H02K 9/00* (2006.01)
*H02K 9/20* (2006.01)

(52) U.S. Cl. .......................... 310/52; 310/54; 310/261; 310/156.03

(58) Field of Classification Search ............ 310/156.03; H02K 9/20
See application file for complete search history.

(56) References Cited

U.S. PATENT DOCUMENTS

| 4,117,357 A | * | 9/1978 | Baumann ...................... 310/52 |
| 4,171,494 A | * | 10/1979 | Yamaguchi et al. ........... 310/52 |
| 4,237,392 A | * | 12/1980 | Ying et al. .................... 310/52 |
| 4,250,418 A | * | 2/1981 | Eckels .......................... 310/64 |
| 4,275,320 A | * | 6/1981 | Baumann et al. .............. 310/52 |
| 5,880,547 A | * | 3/1999 | Shoykhet ...................... 310/91 |
| 6,129,477 A | * | 10/2000 | Shoykhet .................... 403/267 |
| 6,796,739 B1 | * | 9/2004 | Shoykhet .................... 403/267 |

* cited by examiner

Primary Examiner—Darren Schuberg
Assistant Examiner—Naishadh N Desai
(74) Attorney, Agent, or Firm—Dickstein Shapiro LLP

(57) ABSTRACT

A superconductivity rotor has a field coil portion wound with a superconductivity wire, a support portion for supporting the field coil portion, torque tubes positioned at both ends of the support portion and transmitting a torque to an outside from the field coil portion, an inner casing for housing the field coil portion and the support portion; and an outer casing for housing the inner casing and the torque tube. The torque tube consists of a first torque tube positioned at one end of the support portion and a second torque tube positioned at the other end of the support portion. The first torque tube is formed into a vessel shape and has a plurality of engagement holes formed along a periphery thereof so that it is engaged with an engagement member, and the second torque tube comprises a disc-shaped structure consisting of plural plates and main ring-shaped members stacked, and is engaged with an engagement member.

3 Claims, 6 Drawing Sheets

SUPERCONDUCTIVITY ROTOR HAVING TORQUE TUBE

CROSS-REFERENCE TO RELATED APPLICATIONS

This application claims all benefits of Korean Patent Application No. 10-2006-105032 filed on Oct. 27, 2006 in the Korean Intellectual Property Office, the disclosures of which are incorporated herein by reference.

BACKGROUND OF THE INVENTION

1. Field of the Invention

The present invention relates to a superconductivity rotor having a torque tube, and more particularly, to an improvement of a torque tube provided in the superconductivity rotor.

2. Description of the Prior Art

In general, a superconductivity rotor using a superconductivity wire instead of copper wire comprises, as shown in FIG. 1, a field coil portion 10 wound with a superconductivity wire so as to generate a high magnetic field, a support portion 20 for supporting the field coil portion 10 and torque tubes 30 positioned at both ends of the support portion 20 and transmitting a torque to an outside from the field coil portion 10. The field coil portion 10 and the support portion 20 are received in an inner casing 40. The inner casing 40 and the torque tube 30 are received in an outer casing 50.

In addition, one side of the outer casing 50 is formed with a shaft 51 to which load is applied and the other side of the outer casing 50 is formed with an end part 52 connecting with a cooling device.

In the conventional superconductivity rotor having the above structure, the torque tube 30 serves to transmit a torque generated from the support portion 20 to the outer casing 50, in case of a motor, and also serves to transmit a torque applied from the outer casing 50 to the support portion 20, in case of a generator.

The torque tube 30 also serves to minimize heat transfer between the support portion 20 under very low temperature and the outer casing 50 of the superconductivity rotor under room temperature.

In the mean time, the torque tube 30 is formed into a hollow cylindrical shape. Accordingly, the torque tube 30 has only an effect of transmitting the torque and minimizing the heat transfer with the outer casing 50. As a result, it cannot cope with shrinkage occurring in a shaft direction (vertical direction in the drawing).

In addition, the torque tube 30 should be lengthened so as to minimize the heat transfer, so that an overall length of the rotor becomes longer.

SUMMARY OF THE INVENTION

Accordingly, the present invention has been made to solve the above problems. An object of the invention is to provide a superconductivity rotor having a torque tube capable of reducing the heat transfer while surely transmitting the torque and absorbing the shrinkage due to a change of temperature in a shaft direction.

In order to achieve the above object, there is provided a superconductivity rotor comprising: a field coil portion wound with a superconductivity wire; a support portion for supporting the field coil portion; torque tubes positioned at both ends of the support portion and transmitting a torque to an outside from the field coil portion; an inner casing for housing the field coil portion and the support portion; and an outer casing for housing the inner casing and the torque tube. The torque tube consists of a first torque tube positioned at one end of the support portion and a second torque tube positioned at the other end of the support portion. The first torque tube is formed into a vessel shape and has a plurality of engagement holes formed along a periphery thereof so that it is engaged with an engagement member. The second torque tube comprises a disc-shaped structure consisting of plural plates and main ring-shaped members stacked, and is engaged with an engagement member.

In addition, the first torque tube may be thicker at both ends than at a center and the both ends may be engaged with the engagement member, respectively.

Furthermore, the disc-shaped structure may further comprise an auxiliary ring-shaped member when stacking the plate and the main ring-shaped member.

Additionally, the plate, the main ring-shaped member and the auxiliary ring-shaped member may have a plurality of engagement holes formed along peripheries thereof so that they are fastened with the engagement member.

In addition, the plate, the main ring-shaped member and the auxiliary ring-shaped member may have a through-hole formed at a center thereof, respectively, and the auxiliary ring-shaped member may be positioned in the through-hole of the main ring-shaped member.

Furthermore, the engagement member of the second torque tube may further comprise a ring structure and a bolt so as to prevent the engagement member from being unfastened.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
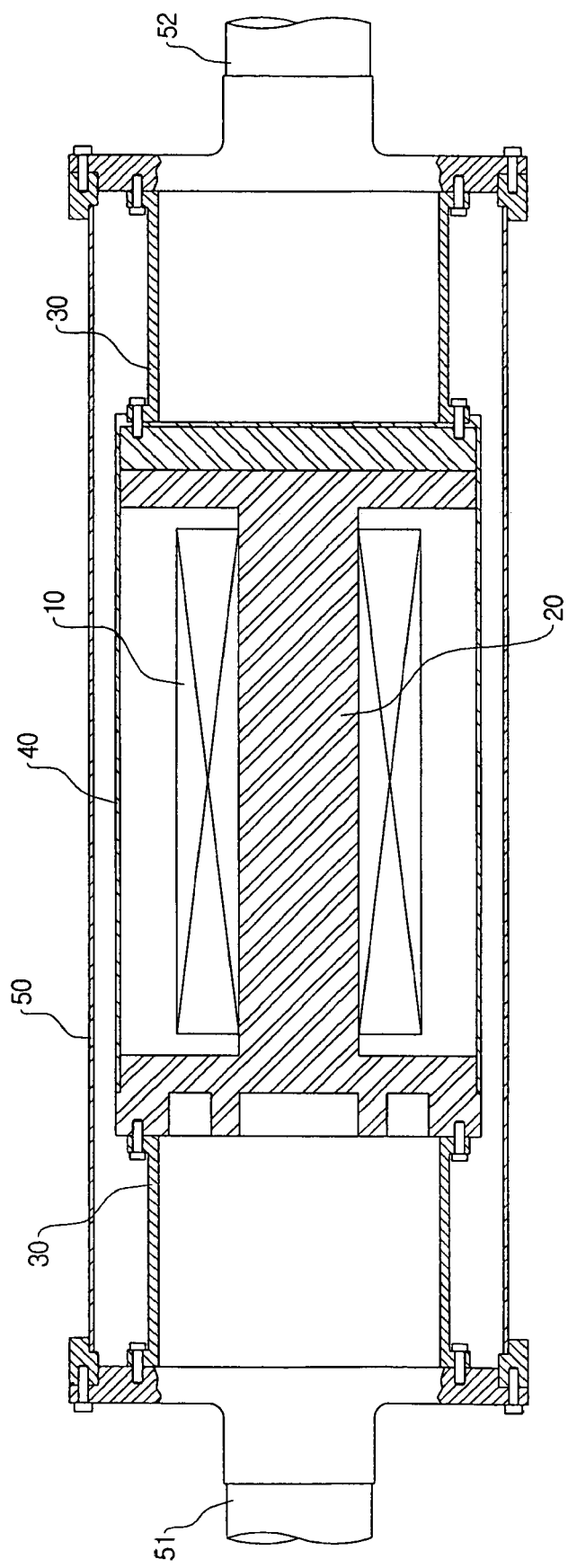
FIG. 1 is a sectional view showing a superconductivity rotor according to the prior art.

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

A same reference numeral is used to indicate the same constitutional element as the prior art and its description is omitted. A new constitutional element is specifically described with a new reference numeral.

Figure 2:
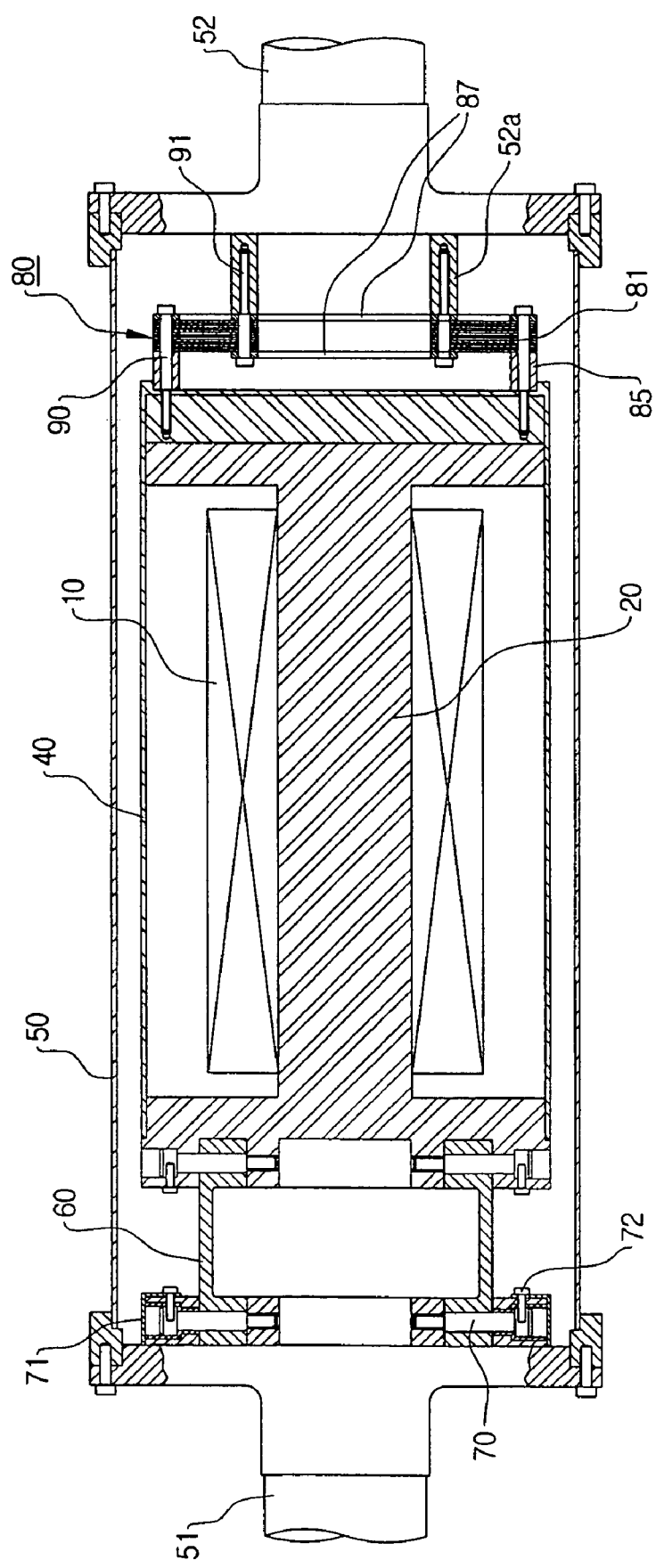
FIG. 2 is a sectional view showing a superconductivity rotor according to an embodiment of the invention.
Figure 3:
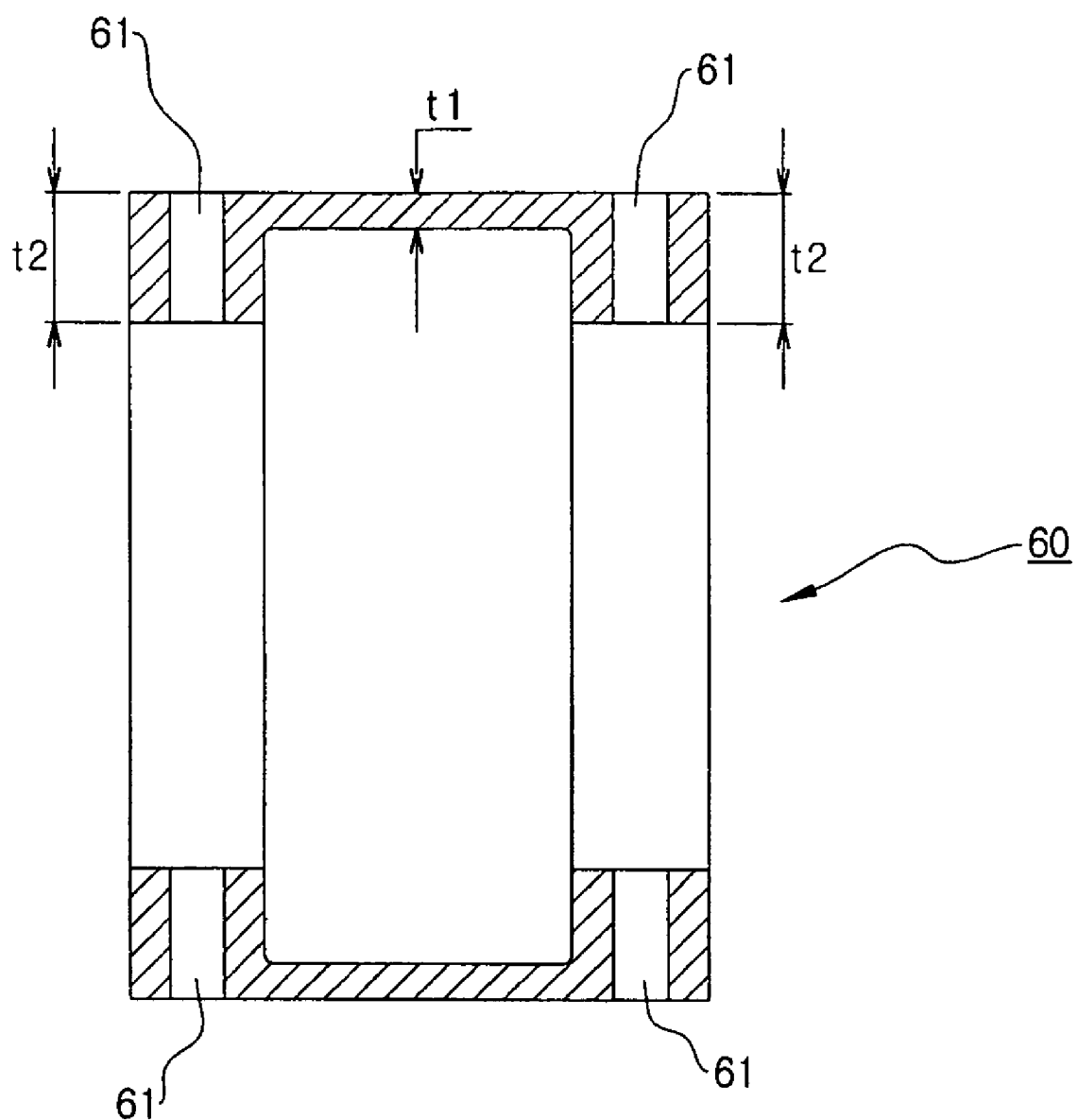
FIG. 3 is a sectional view showing a first torque tube of a superconductivity rotor according to an embodiment of the invention.

FIG. 2 is a sectional view showing a superconductivity rotor according to an embodiment of the invention and FIG. 3 is a sectional view showing a first torque tube of a superconductivity rotor according to an embodiment of the invention.

As shown in FIGS. 2 and 3, the invention comprises a field coil portion 10 wound with a superconductivity wire; a support portion 20 for supporting the field coil portion 10; an inner casing 40 for housing the field coil portion 10 and the support portion 20; and an outer casing 50 for housing the inner casing 40 and a torque tube.

Here, the superconductivity rotor according to an embodiment of the invention comprises torque tubes at both ends of the support portion 20, which have structures different from each other. A first torque tube 60 positioned at one end of the support portion 20 is formed into a vessel shape, preferably cylindrical shape and has a plurality of engagement holes 61 formed along peripheries of both ends thereof, so that the first torque tube is engaged with a first engagement member 70 through the engagement holes 61.

The first engagement member 70 consists of a reamer bolt having no threads at a portion abutting on the engagement hole 61. If the reamer bolt has threads and the engagement hole 61 has also threads, the threads are apt to be broken when torque is applied.

A second torque tube 80 provided to the other end of the support portion 20 comprises a thin disc-shaped structure 81. The disc-shaped structure 81 consists of plural members stacked and is engaged with second engagement members 90, 91.

Figure 4:
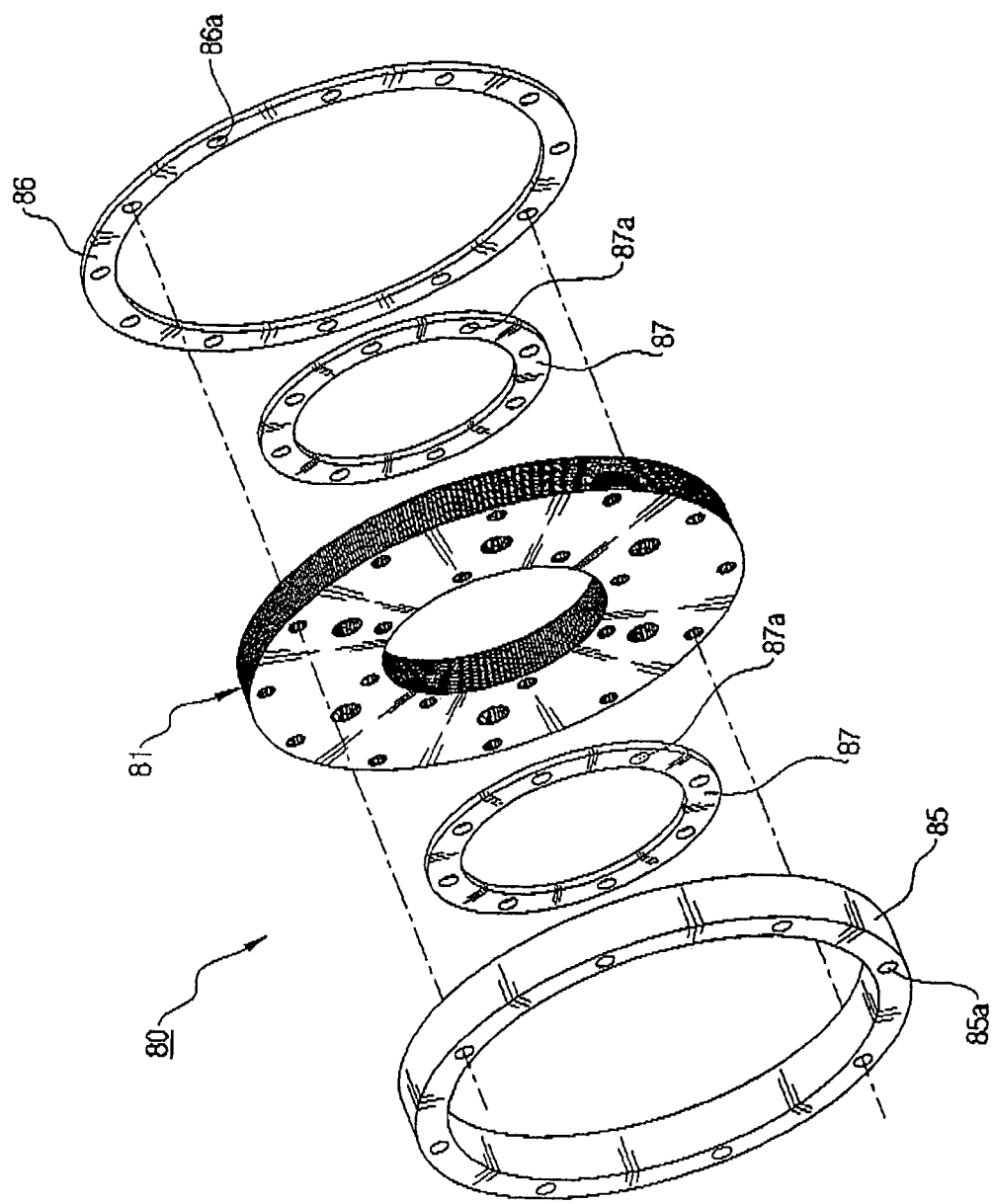
FIG. 4 is a sectional view showing a second torque tube of a superconductivity rotor according to an embodiment of the invention.
Figure 5:
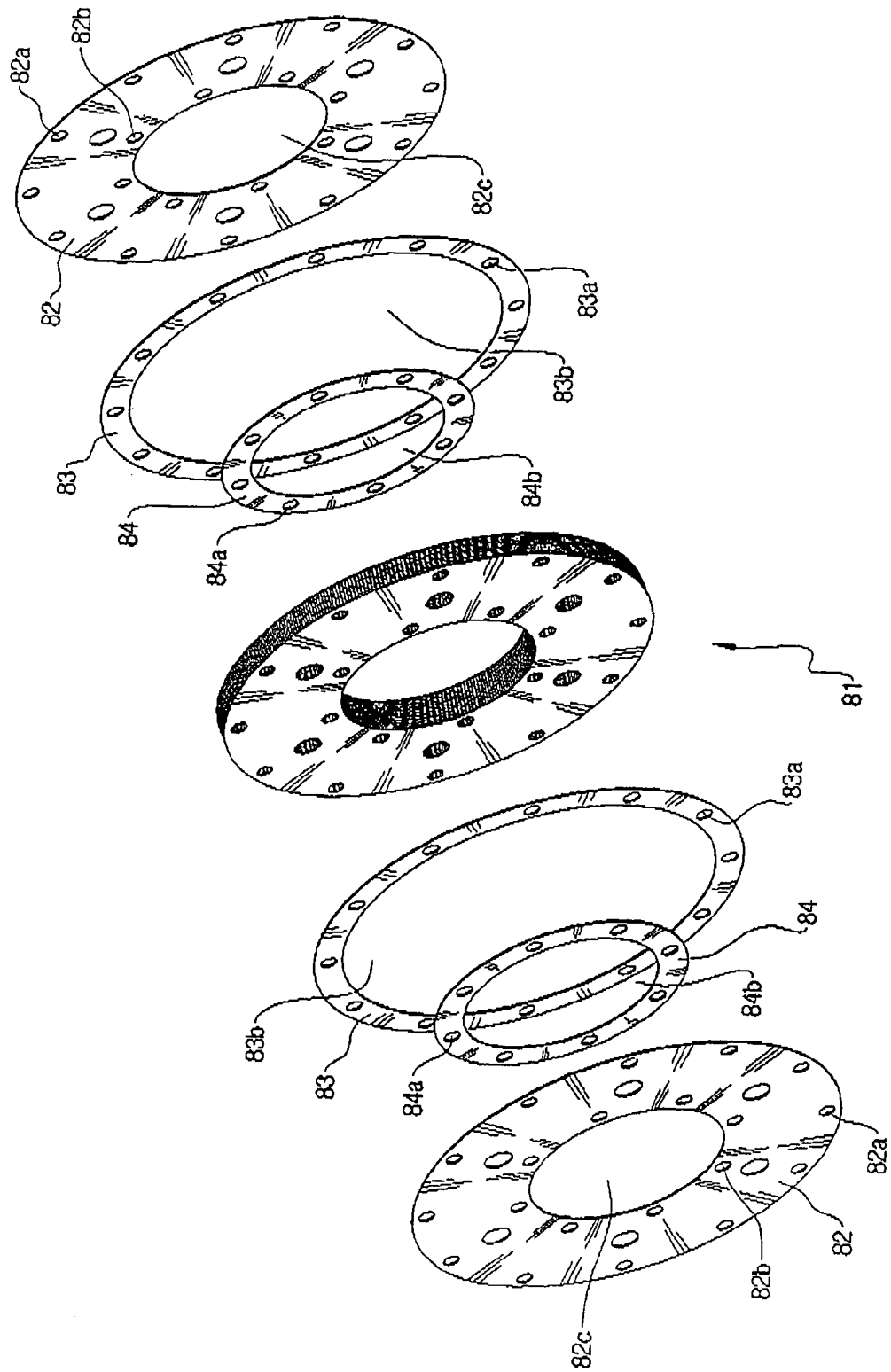
FIG. 5 is an exploded perspective view showing a disc-shaped structure of a second torque tube according to an embodiment of the invention.
Figure 6:
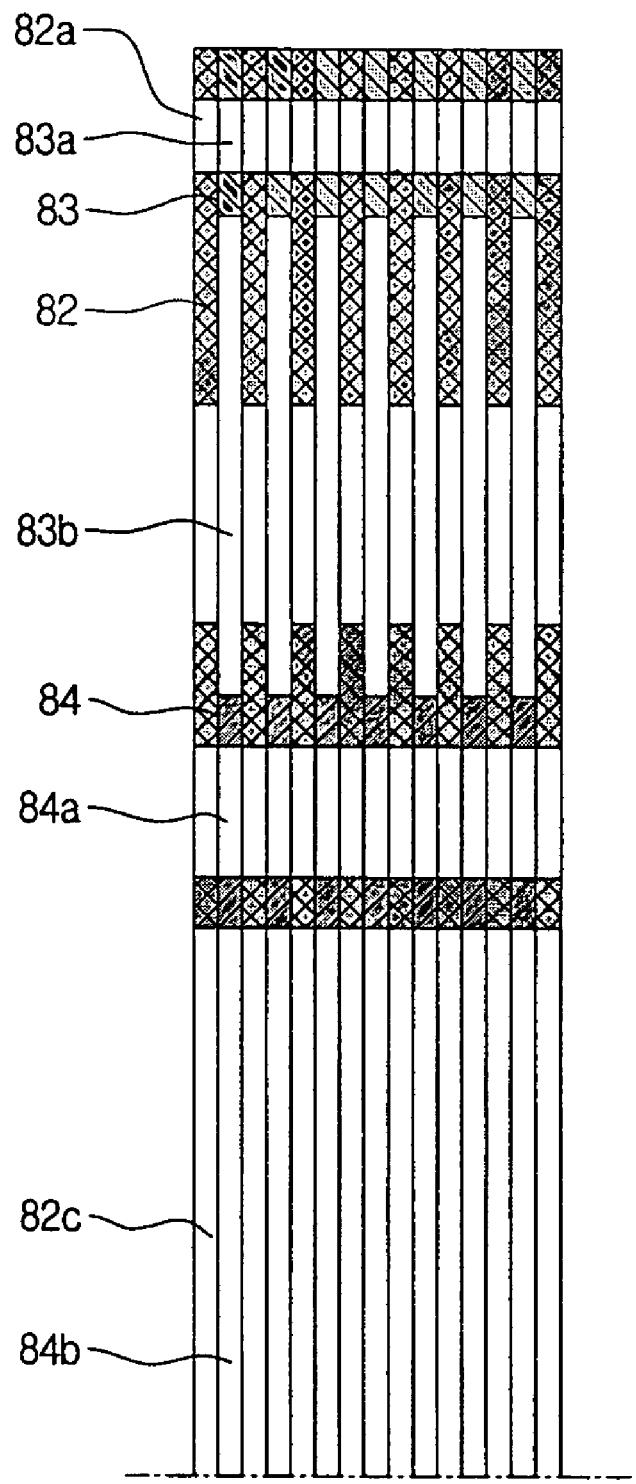
FIG. 6 is a partial enlarged sectional view showing a disc-shaped structure of a second torque tube according to an embodiment of the invention.

FIG. 4 is a sectional view showing a second torque tube of a superconductivity rotor according to an embodiment of the invention, FIG. 5 is an exploded perspective view showing a disc-shaped structure of a second torque tube according to an embodiment of the invention, and FIG. 6 is a partial enlarged sectional view showing a disc-shaped structure of a second torque tube according to an embodiment of the invention.

Referring to FIGS. 4 to 6, a plate 82 and a main ring-shaped member 83 forms one group and they are repetitively stacked, thereby forming the disc-shaped structure 81.

In addition, an auxiliary ring-shaped member 84 is positioned between the main ring-shaped member 83 and the plate 82 and in the main ring-shaped member 83.

The plate 82, the main ring-shaped member 83 and the auxiliary ring-shaped member 84 are respectively formed with a plurality of engagement holes 82a, 83a, 84a along the peripheries thereof so that the second engagement members 90, 91 are fastened through the holes.

In addition, the plate 82 is formed with another engagement holes 82b so that the engagement member 91 passes through the holes when combining the inner engagement member 91 positioned at the inside.

Herein, when the plate 82 and the main ring-shaped member 83 are stacked, the auxiliary ring-shaped member 84 is directly contacted to one face of the plate because the auxiliary ring-shaped member 84 is positioned in the through-hole 83b of the main ring-shaped member 83 and has a same thickness as that of the main ring-shaped member 83.

When the second torque tube 80 is engaged with the engagement member 90, the support members 85, 86 are arranged at upper and lower parts of the disc-shaped structure 81, respectively. The support members 85, 86 have through-holes 85a, 86a formed along peripheries thereof, through which the engagement member 90 passes. It is preferred that the support member 85 at the support portion 20 is thicker that the support member 86 at opposite side. This is to prevent the damage in assembling and to reduce the contact heat resistance and the heat transfer through the low heat conductivity.

In addition, the engagement member 91 positioned at the outside is engaged with a connecting element 52a (refer to FIG. 2) protruding in the direction of the inside face of the end part 52, i.e., in the direction of the second torque tube 80. At this time, support members 87 having a radius smaller than the second torque tube 80 are arranged at both sides of the disc-shaped structure 81. The support member 87 has engagement holes 87a formed at the periphery thereof, through which the engagement member 81 passes, thereby enabling the engagement member 91 to pass through the second torque tube 80 and thus to connect with the connecting element 52a.

The first torque tube 60 is formed to be thicker at both ends (t2) than at the center (t1) thereof and has engagement holes 61 formed at the both ends, into which the engagement member 70 is inserted.

The reason to make the first torque tube 60 thicker at both ends (t2) than at the center (t1) is to enlarge a contact area between the reamer bolt, which is the engagement member 70, and the engagement hole 61 and to minimize a tolerance, thereby reducing torsion deformation of the connected part when the rotor is rotated and transferring the torque more stably.

In addition, the engagement member 70 is connected with a ring structure 71 and a bolt 72 so as to prevent the reamer bolt, which is the engagement member 70, from being unfastened when the rotor is rotated at high speed.

The first and second torque tubes 60, 80 constituting the torque tube are preferably made of a glass fiber reinforced plastic (GFRP) plastic having a low heat conductivity and a high rigidity.

Herein, as described above, since the second torque tube 80 has a disc-shaped stacked structure, it is applied with the torque which is relatively low compared to the first torque tube 60 and can absorb the shrinkage and expansion due to the very low temperature cooling.

In addition, since the second torque tube 80 is thin and consists of several members with being flexible, it can provide a rotation rigidity and allows a movement in the rotating shaft direction. Furthermore, the second torque tube 90 has the high contact heat resistance of the contact surface, it can reduce the heat transfer and a length of the shaft direction by lengthening the heat transfer path in the circumferential direction. Thereby, it is possible to reduce an overall length of the superconductivity rotor.

The engagement members 90, 91 used when assembling the second torque tube 80 are preferably reamer bolts, as in the case of the first torque tube.

As described above, according to the superconductivity rotor of the invention, the first torque tube is provided at the shaft side applied with the load, so that it is possible to transfer the torque while coping with the rotating stress occurring intensively. In addition, the second torque tube is provided at the end part side which is not applied with the load, so that it is possible to absorb the shrinkage of the shaft direction due to the very low temperature cooling.

As a result, it is not necessary to separately provide means for solving the shrinkage and it is possible to simplify the interior structure of the superconductivity motor and the generator. In addition, since the length of the shaft direction can be reduced, the overall size of the superconductivity rotor can be reduced.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A superconductivity rotor comprising:
a field coil pattern would with a superconductivity wire;
a support portion for supporting the field coil portion;
a torque tube positioned at both ends of the support portion and transmitting a torque to an outside from the field coil portion;
an inner casing for housing the field coil portion and the support portion; and
an outer casing for housing the inner casing and the torque tube,
wherein the torque tube consists of a first torque tube positioned at one end of the support portion and a second torque tube positioned at the other end of the support portion,
the first torque tube is formed into a vessel shape and has a plurality of engagement holes formed along a periphery thereof so that the first torque tube is engaged with an engagement member,
the second torque tube comprises a disc-shaped structure consisting of plural plates, main ring-shaped members stacked, and an auxiliary ring-shaped member when stacking the plate and the main ring-shaped member, and is engaged with an engagement member, and
the plate, the main ring-shaped member and the auxiliary ring-shaped member have a plurality of engagement holes formed along peripheries thereof so that they are fastened with the engagement member, and a through-hole formed at a center thereof, respectively, and the auxiliary ring-shaped member is positioned in the through-hole of the main ring-shaped member.

2. The superconductivity rotor according to claim 1, wherein the first torque tube is thicker at both ends than at a center and the both ends are engaged with the engagement member, respectively.

3. The superconductivity rotor according to claim 1, wherein the engagement member of the second torque tube further comprises a ring structure and a bolt so as to prevent the engagement member from being unfastened.

* * * * *